(12) United States Patent
Hotta

(10) Patent No.: US 12,001,037 B2
(45) Date of Patent: Jun. 4, 2024

(54) LIGHT CONTROL FILTER

(71) Applicant: Shin-Etsu Polymer Co., Ltd., Tokyo (JP)

(72) Inventor: Shinji Hotta, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 830 days.

(21) Appl. No.: 17/053,355

(22) PCT Filed: May 8, 2019

(86) PCT No.: PCT/JP2019/018402
§ 371 (c)(1),
(2) Date: Jan. 7, 2021

(87) PCT Pub. No.: WO2019/216342
PCT Pub. Date: Nov. 14, 2019

(65) Prior Publication Data
US 2021/0231848 A1 Jul. 29, 2021

(30) Foreign Application Priority Data
May 10, 2018 (JP) .................. 2018-091448

(51) Int. Cl.
*G02B 5/22* (2006.01)
(52) U.S. Cl.
CPC ..................... *G02B 5/22* (2013.01)
(58) Field of Classification Search
None
See application file for complete search history.

(56) References Cited

U.S. PATENT DOCUMENTS

2007/0268586 A1* 11/2007 Mimura
2019/0251897 A1* 8/2019 Toyama .................. G02B 5/20

FOREIGN PATENT DOCUMENTS

| JP | H515836 A | 1/1993 |
| JP | 2007334279 A | 12/2007 |
| JP | 201320118 A | 1/2013 |
| JP | 2013020118 A * | 1/2013 |
| JP | 2013233696 A | 11/2013 |
| JP | 20148445 A | 1/2014 |

(Continued)

OTHER PUBLICATIONS

International Search Report in PCT Application No. PCT/JP2019/018402, dated Aug. 6, 2019, 4pp.

*Primary Examiner* — Marin Pichler
*Assistant Examiner* — Mackenzi Waddell
(74) *Attorney, Agent, or Firm* — HAUPTMAN HAM, LLP

(57) ABSTRACT

A light control filter includes a sheet having a sea-island structure including a light-transmitting portion and a light-shielding portion, wherein the light-transmitting portion and the light-shielding portion each extend from a first principal surface to a second principal surface, wherein any one of the light-transmitting portion and the light-shielding portion forms a plurality of island portions configured to penetrate through the sheet from the first principal surface to the second principal surface, and another of the light-transmitting portion and the light-shielding portion forms a sea portion configured to separate the plurality of island portions from one another, and wherein the sea portion has an MD-1 rubber hardness of 25 or more and 80 or less.

2 Claims, 5 Drawing Sheets

(56) References Cited

FOREIGN PATENT DOCUMENTS

| JP | 2014142637 | A | * | 8/2014 | ......... G06F 21/6245 |
|---|---|---|---|---|---|
| JP | 2014142637 | A | | 8/2014 | |
| JP | 201754129 | A | | 3/2017 | |
| JP | 2017054129 | A | * | 3/2017 | ............... G02B 5/02 |
| KR | 100609370 | B1 | | 8/2006 | |
| WO | WO-2012162458 | A2 | * | 11/2012 | ............... G02B 5/02 |
| WO | WO-2014096906 | A1 | * | 6/2014 | ............... G02B 3/08 |
| WO | WO-2014103343 | A1 | * | 7/2014 | ......... G06F 21/6245 |

* cited by examiner

LIGHT CONTROL FILTER

RELATED APPLICATIONS

The present application is a National Phase of International Application No. PCT/JP2019/018402, filed May 8, 2019, and claims priority based on Japanese Patent Application No. 2018-091448, filed May 10, 2018.

TECHNICAL FIELD

This disclosure relates to a light control filter. This application claims priority from Japanese Patent Application No. 2018-091448, filed on May 10, 2018, the contents of which are incorporated herein by reference in their entirety.

BACKGROUND ART

There has hitherto been known a light control film for regulating a transmittance and a viewing angle of light. For example, in Patent Literature 1, there has been proposed a light control film, which includes, as abase film, a photocurable resin containing alight-absorbing material, and in which a plurality of mortar-shaped recesses each having a diameter reduced from one principal surface of the base film to another principal surface on an opposite side are formed. Each of the recesses does not penetrate through the film, and a bottom surface of the recess is formed of a land film made of the above-mentioned photocurable resin having a thickness of more than 0.1 μm. The land film is inevitably formed in a manufacturing process of the light control film of Patent Literature 1. The manufacturing process involves pouring a polymerizable resin into a mold, curing the polymerizable resin to obtain a microstructured layer, and then laminating a flexible layer configured to support the microstructured layer.

CITATION LIST

Patent Literature

[PTL 1] JP 2017-54129 A

SUMMARY OF INVENTION

Technical Problem

The light having entered the recess of the light control film of Patent Literature 1 needs to be transmitted through the land film. The land film includes the light-absorbing material. Therefore, there is a problem in that a part of the incident light is absorbed, and the amount of transmitted light is reduced. In addition, in the case where a liquid transparent material is injected into the recess in the manufacturing process, when the land film is present, there is a problem in that air bubbles remain in the recess. Therefore, it is desired that the land film not be present on the bottom surface of the recess. However, in a manufacturing method disclosed in Patent Literature 1, the land film is inevitably generated, and there is no disclosure of a method of removing the land film.

The photocurable resin forming the light control film of Patent Literature 1 is relatively brittle among synthetic resins. Therefore, when the photocurable resin is poured into a mold, and a cured microstructured layer is released from the mold, cracks and chips are liable to occur. In order to prevent the occurrence of those defects, it is required to laminate a flexible layer (support layer) configured to support the microstructured layer. When the land film is present on the bottom surface of each of the recesses of the microstructured layer, there is an advantage in that the support layer can be easily laminated.

However, in consideration of increasing the light-transmitting property of the light control film and reducing the thickness of a device to which the light control film is to be mounted, there is a demand for a light control body in which the microstructured layer can be handled as a single layer (film) without laminating the support layer.

This disclosure provides a light control filter that can be handled as a single layer.

Solution to Problem

[1] A light control filter, including a sheet having a sea-island structure including a light-transmitting portion and a light-shielding portion, wherein the light-transmitting portion and the light-shielding portion each extend from a first principal surface to a second principal surface, wherein any one of the light-transmitting portion and the light-shielding portion forms a plurality of island portions configured to penetrate through the sheet from the first principal surface to the second principal surface, and another of the light-transmitting portion and the light-shielding portion forms a sea portion configured to separate the plurality of island portions from one another, and wherein the sea portion has an MD-1 rubber hardness of 25 or more and 80 or less.

[2] The light control filter according to Item [1], wherein the sea portion includes 50 mass % or more of an elastomer with respect to a total mass of the sea portion.

[3] The light control filter according to Item [1] or [2], wherein the plurality of island portions are each the light-transmitting portion, and the sea portion is the light-shielding portion.

[4] The light control filter according to Item [3], wherein the plurality of island portions are each hollow.

[5] The light control filter according to Item [3] or [4], wherein an aspect ratio between a size of each of the plurality of island portions in plan view of the sheet and a height of each of the plurality of island portions in a thickness direction of the sheet is from 1:5 to 1:30.

[6] The light control filter according to any one of Items [3] to [5], wherein a size of each of the plurality of island portions in plan view of the sheet is 5 μm or more and 100 μm or less.

[7] The light control filter according to Item [1] or [2], wherein the plurality of island portions are each the light-shielding portion, and the sea portion is the light-transmitting portion.

[8] The light control filter according to any one of Items [1] to [7], wherein a three-dimensional shape of each of the plurality of island portions in the sheet is a columnar shape.

[9] The light control filter according to any one of Items [1] to [8], wherein the plurality of island portions are arranged in a two-dimensional array in plan view of the sheet.

[10] The light control filter according to any one of Items [1] to [9], wherein the plurality of island portions each include 50 mass % or more of an elastomer with respect to a total mass of the plurality of island portions.

[11] The light control filter according to any one of Items [1] to [10], wherein the sea portion and the plurality of island portions each include an elastomer of the same kind.

[12] The light control filter according to Item [11], wherein the elastomer is a silicone rubber.

Advantageous Effects of Invention

The light control filter according to this disclosure has high flexibility and is easily elastically deformed because at least the sea portion thereof has an MD-1 rubber hardness of 25 or more and 80 or less. Therefore, the support layer and the land film, which have hitherto been required, are not essentially required members. With this, the light control filter can be handled in the form of a single layer as a single light control filter, and is excellent in light-transmitting property. In addition, it is not required to laminate the support layer. Therefore, the light control filter can be reduced in thickness, and the foregoing is useful also for reduction in thickness of a device to which the light control filter is to be mounted.

BRIEF DESCRIPTION OF DRAWINGS

FIG. 5A is an illustration of a state in which an elastomer precursor L is applied to the surface of a molding mold K. FIG. 5B is an illustration of a state in which the elastomer precursor L having overflowed from a recess M of the molding mold K forms a residual film N. FIG. 5C is an illustration of the light control filter 10 having the residual film N removed therefrom, taken out from the molding mold K. FIG. 5D is an illustration of a state in which island portions 5 of the light control filter 10 are filled with a material. FIG. 5E is an illustration of the light control filter 20 in which a transparent sealing layer is laminated on each of principal surfaces of the light control filter 10.

DESCRIPTION OF EMBODIMENTS

A light control filter of this disclosure is a light control filter including a sheet having a sea-island structure including a light-transmitting portion and a light-shielding portion. The light-transmitting portion and the light-shielding portion each extend from a first principal surface to a second principal surface. Any one of the light-transmitting portion and the light-shielding portion forms a plurality of island portions that penetrate through the sheet from the first principal surface to the second principal surface, and another of the light-transmitting portion and the light-shielding portion forms a sea portion configured to separate the plurality of island portions from one another. The sea portion has an MD-1 rubber hardness of 25 or more and 80 or less.

A main body of the light control filter is a sheet. The single sea portion forms the sheet, and the plurality of island portions form a plurality of penetration regions that penetrate through the sheet in a thickness direction.

First Embodiment

Figure 1:
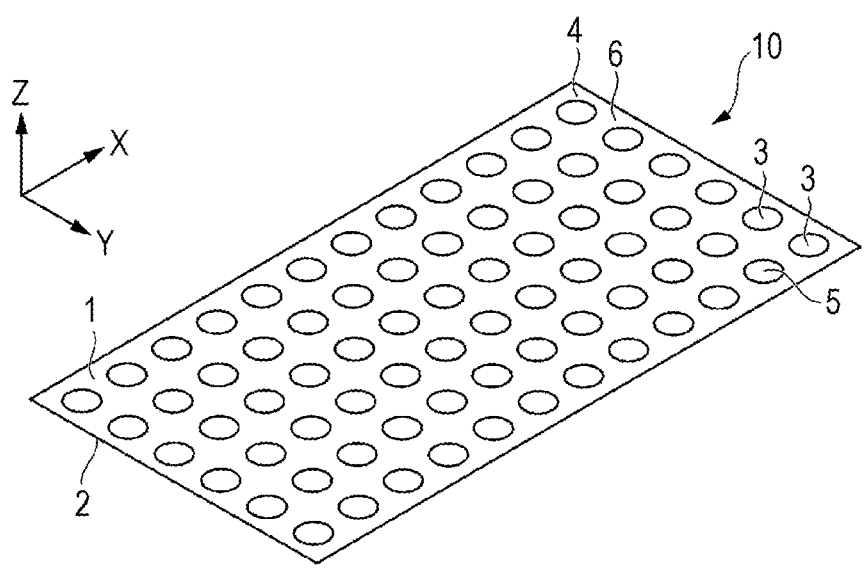
FIG. 1 is a perspective view for illustrating a light control filter 10 according to a first embodiment of this disclosure.

A light control filter 10 illustrated in FIG. 1 as a first embodiment of this disclosure includes a first principal surface 1 and a second principal surface 2 on an opposite side, light-transmitting portions 3 that extend between the first principal surface 1 and the second principal surface 2, and a light-shielding portion 4 that extends between the first principal surface 1 and the second principal surface 2. The light-transmitting portions 3 and the light-shielding portion 4 form a sea-island structure. The light-transmitting portions 3 form a plurality of island portions 5 that penetrate through the light control filter from the first principal surface 1 to the second principal surface 2, and the light-shielding portion 4 that does not form the island portions 5 forms a sea portion 6 configured to separate the plurality of island portions 5 from one another. The sea portion 6 has an MD-1 rubber hardness of 25 or more and 80 or less. The MD-1 rubber hardness is preferably 40 or more and 75 or less, more preferably 50 or more and 70 or less.

When the MD-1 rubber hardness is equal to or more than the above-mentioned lower limit value, it becomes easy to cut an excess residual film after the light control filter 10 is taken out from a molding mold at the time of manufacturing, and a smooth principal surface can be easily obtained. When the MD-1 rubber hardness is equal to or less than the above-mentioned upper limit value, it becomes easy to take out the light control filter 10 from the molding mold at the time of manufacturing.

The MD-1 rubber hardness is a value measured from the light control filter 10 formed only of the sea portion 6 by pressing the sea portion of the light control filter in a thickness direction of a sheet at a temperature of from 21° C. to 25° C., preferably 23° C. through use of a micro rubber hardness meter. In the measurement, the hardness is measured by reading, with a detector, the amount of displacement generated when the surface of a test piece is deformed with pressing needles provided in the micro rubber hardness meter. The locations which are pressed with the pressing needles are set to be ten or more randomly selected locations in the sea portion, and an average value thereof is defined as a measurement value. In general, the MD-1 rubber hardness indicates a value close to a value (Shore A hardness) measured with a type A durometer specified under JIS K6253-3:2012. Through use of the micro rubber hardness meter, the hardness of a thin test piece can be easily measured. However, when the thickness of the sea portion of the light control filter (test piece) is less than 1.0 mm, a plurality of the same light control filters are stacked to form a laminate, and the hardness in a thickness direction of a laminate of 1.0 mm or more obtained by stacking a minimum number of the light control filters is measured.

The micro rubber hardness meter to be used is preferably "Micro Rubber Hardness Meter" product name: MD-1capa manufactured by Kobunshi Keiki Co., Ltd. The load system of this micro rubber hardness meter is a cantilever plate spring. The measurement is performed by setting a pressing needle shape to type A (height: 0.50 mm, φ0.16 mm, columnar shape), pressure leg dimensions to type A (outer diameter: 4.0 mm, inner diameter: 1.5 mm), a spring load to 22 mN (2.24 g), and a measurement mode to a normal mode, respectively.

For example, the island portions 5 are removed by laser irradiation, chemical etching, or the like to obtain the light control filter 10 formed only of the sea portion 6, and the resultant is used as a test piece. The temperature of each of the test piece to be measured for an MD-1 rubber hardness and a test chamber is set to from 21° C. to 25° C., preferably 23° C.

It is preferred that the sea portion 6 having the above-mentioned MD-1 rubber hardness include an elastomer and be formed of the elastomer.

In addition, the MD-1 rubber hardness of the entire light control filter 10 including the sea portion 6 and the island portions 5 is preferably 25 or more and 80 or less, more preferably 40 or more and 75 or more, still more preferably 50 or more and 70 or more.

It is preferred that the MD-1 rubber hardness of the entire light control filter 10 fall within the above-mentioned ranges because the light control filter 10 has high flexibility and can be easily elastically deformed.

The MD-1 rubber hardness of the entire light control filter 10 is obtained by measuring an MD-1 rubber hardness in a thickness direction of the light control filter 10 in each of ten or more randomly selected locations based on the above-mentioned measurement method, and averaging those measurement values.

Examples of the elastomer include: thermosetting elastomers, such as a urethane rubber, an isoprene rubber, an ethylene propylene rubber, a natural rubber, an ethylene propylene diene rubber, a styrene butadiene rubber, and a silicone rubber; thermoplastic elastomers, such as urethane-based, ester-based, styrene-based, olefin-based, butadiene-based, and fluorine-based elastomers; and composites thereof. Of those, a silicone rubber is preferred. The silicone rubber has a small dimensional change after being taken out from a molding mold described later, and is not warped after being taken out from the molding mold. The silicone rubber has a small compression set and high heat resistance, and is also excellent in weather resistance and cold resistance.

The elastomer is preferably a polymer having a Shore A hardness, which is measured through use of a durometer in accordance with JIS K6253-3:2012, of A25 or more and A80 or less, more preferably a polymer having a Shore A hardness of A40 or more and A75 or less, still more preferably a polymer having a Shore A hardness of A50 or more and A70 or less. The reasons that the silicone rubber is preferred are as described above.

Figure 2:
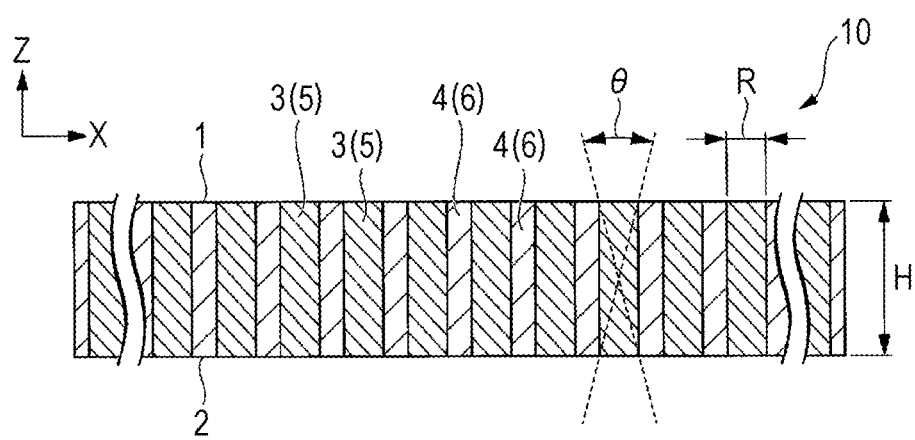
FIG. 2 is a sectional view of the vicinity of a center of the light control filter 10 of FIG. 1 taken along the X-axis.

The light control filter 10 has a rectangular sheet shape. A longitudinal direction thereof is defined as the X-direction (the left-right direction of the drawing sheet in FIG. 2), a short direction thereof is defined as the Y-direction (the vertical direction of the drawing sheet in FIG. 2), and a direction perpendicular to the principal surface thereof (that is, the thickness direction of the sheet) is defined as the Z-direction.

The shape of the light control filter 10 in plan view is not limited to a rectangle, and a circle, an ellipse, a polygon, or any other shapes may be adopted.

The vertical and horizontal sizes of the light control filter 10 are not particularly limited, and may be set to, for example, sizes of from 5 mm×5 mm to 100 cm×100 cm.

The thickness of the light control filter 10 is, for example, preferably 50 µm or more and 1,000 µm or less, more preferably 80 µm or more and 500 µm or less, still more preferably 100 µm or more and 300 µm or less.

When the thickness is equal to or more than the above-mentioned lower limit value, it becomes easier to control the viewing angle of light. When the thickness is equal to or less than the above-mentioned upper limit value, the flexibility becomes higher.

The thickness of the light control filter 10 is determined as an average value of values measured in ten or more randomly selected cross-sections. Known microstructure observation means, such as a measurement microscope, is applied to the measurement.

The light control filter 10 has a sea-island structure including the plurality of island portions 5 forming the light-transmitting portions 3 (sometimes referred to as "first portions") and the sea portion 6 forming the light-shielding portion 4 (sometimes referred to as "second portion").

A main body of the light control filter 10 is a sheet. One surface of the sheet is referred to as "first principal surface", and another surface is referred to as "second principal surface".

The total area of the sea portion 6 with respect to the total area of the first principal surface 1 is preferably from 36% to 99.2%, more preferably from 49% to 96%, still more preferably from 65% to 91%. It is preferred that the total area of the sea portion 6 on the second principal surface 2 be also similar to that of the sea portion 6 on the first principal surface 1.

The total area of the island portions 5 and the sea portion 6 on each principal surface is determined by subjecting an image obtained by photographing each principal surface to image processing by a known method.

The light beam transmittance of each of the light-transmitting portions 3 is preferably 70% or more, more preferably 80% or more, still more preferably 90% or more. The light beam transmittance of the light-transmitting portions 3 may be 100%. When the light beam transmittance is equal to or more than the above-mentioned lower limit value, the amount of light passing through the light control filter 10 is sufficient.

The light beam transmittance of the light-shielding portion 4 is preferably less than 70%, more preferably less than 50%, still more preferably less than 30%, particularly preferably less than 10%. The light beam transmittance of the light-shielding portion 4 may be 0%. When the light beam transmittance is less than the above-mentioned upper limit value, the viewing angle is sufficiently controlled by the light control filter 10.

For example, it is preferred that the light beam transmittance of each of the light-transmitting portions 3 be 70% or more and 100% or less, and the light beam transmittance of the light-shielding portion 4 be 0% or more and less than 70%. It is more preferred that the light beam transmittance of each of the light-transmitting portions 3 be 80% or more and 100% or less, and the light beam transmittance of the light-shielding portion 4 be 0% or more and less than 50%. It is still more preferred that the light beam transmittance of each of the light-transmitting portions 3 be 90% or more and 100% or less, and the light beam transmittance of the light-shielding portion 4 be 0% or more and less than 30%.

Herein, the value of the "light beam transmittance" is set to a value determined by the expression: light transmittance=(B/A)×100 (unit: %) in an apparatus which uses $D_{65}$ specified under JIS Z8720:2012 as a light source, and which is configured to measure intensity of inspection light emitted from the light source with a light-receiving sensor. In the expression, "A" represents an output value of the light-receiving sensor in a state in which there is no object to be measured on an optical path of the inspection light, and "B" represents an output value in a state in which an object to be measured is set on the optical path of the inspection light, and the transmitted light transmitted through the object to be measured is received by the light-receiving sensor.

(Light-Transmitting Portion)

The light-transmitting portions 3 of the light control filter 10 correspond to the island portions 5 in the sea-island structure and a plurality of columnar transparent portions that are separated from one another by the sea portion 6. Each of the island portions 5 penetrates through the light control filter 10. Therefore, a first end portion of each of the island portions 5 is exposed to the first principal surface 1 of the light control filter 10, and a second end portion of each of the island portions 5 is exposed to the second principal surface 2 of the light control filter 10. The respective island portions 5 are arranged at a constant pitch along the X-direction and the Y-direction.

It is preferred that the three-dimensional shape of each of the island portions 5 that penetrate through the light control filter 10 in the Z-direction be a columnar shape. Herein, the island portion 5 having a columnar shape means that the island portion 5 is recognized as a three-dimensional columnar shape when it is assumed that the island portion 5 is taken out from the light control filter 10. The height direction of the columnar shape is along the thickness direction of the light control filter 10. An upper surface (top surface) and a bottom surface of a column forming the columnar shape are parallel to the first principal surface 1 and the second principal surface 2, respectively.

As a sectional shape obtained by cutting the island portion 5 in the XY-plane, there are given, for example, a circle, an ellipse, a rectangle, and other polygons. The sectional shape of the first end portion of the island portion 5 exposed to the first principal surface 1 (planar shape of the island portion 5 on the first principal surface 1) and the sectional shape of the second end portion exposed to the second principal surface 2 (planar shape of the island portion 5 on the second principal surface 2) may be identical to or different from each other. From the viewpoint of ease of light control, it is preferred that the sectional shapes be identical to each other. The sectional shapes of the respective island portions may be identical to or different from each other. From the viewpoint of ease of light control, it is preferred that the sectional shapes be identical to each other.

An axial line of a center axis of the columnar island portion 5 may be perpendicular or inclined with respect to the first principal surface 1 and the second principal surface 2. From the viewpoints of ease of manufacturing and ease of viewing angle control, it is preferred that the axial line be substantially perpendicular to the first principal surface 1 and the second principal surface 2. Herein, "substantially perpendicular" refers to intersecting at 90°±2°. When the axial line is substantially perpendicular to the first principal surface 1 and the second principal surface 2, a height H of the columnar island portion 5 is substantially the same as the thickness of the light control filter 10.

The angle formed by the axial line and the principal surface, and the height H of the island portion 5 are determined by measuring a cross-section including the island portion 5 and the principal surface with known microstructure observation means, such as a measurement microscope. The height H of the island portion 5 is a distance between the first principal surface 1 and the second principal surface 2.

Regarding each of the island portions 5, a size R of the end portion exposed to each principal surface is a diameter of a smallest circle including the end portion. The diameter is, for example, preferably from 5 μm to 100 μm, more preferably from 10 μm to 50 μm from the viewpoint of ease of control of the viewing angle of light transmitted through the light control filter 10. When the diameter is equal to or more than the above-mentioned lower limit value, breakage of a part (for example, a columnar protruding portion) of the molding mold to be used at the time of manufacturing, which corresponds to the island portion 5, can be prevented. When the diameter is equal to or less than the above-mentioned upper limit value, an aspect ratio described later can be easily increased even when the light control filter 10 is thin.

The sizes R of two end portions exposed to the respective principal surfaces of the single island portion 5 may be identical to or different from each other.

An average of the diameters of ten or more island portions 5 that are randomly selected from the plurality of island portions 5 on an arbitrary principal surface of the light control filter 10 is preferably from 5 μm to 100 μm, more preferably from 10 μm to 50 μm.

The diameter may be measured with known microstructure observation means, such as a measurement microscope.

The aspect ratio represented by (size R:height H) of the columnar island portion 5 is preferably from 1:5 to 1:30, more preferably from 1:8.5 to 1:25.5.

When the aspect ratio is from 1:5 to 1:30, and the island portion 5 is hollow, a viewing angle θ is from 22.6° to 3.6°. When the aspect ratio is from 1:8.5 to 1:25.5, the viewing angle θ is from 13.4° to 4.5°. In addition, when the island portion 5 is filled with a transparent material, the refractive index of the transparent material is usually larger than that of air, and hence the viewing angle θ is widened as compared to the range in the case in which the island portion 5 is hollow as described above. Therefore, from the viewpoint of narrowing the viewing angle θ, it is preferred that the island portion 5 be hollow.

In the case of the lower limit value or more within the above-mentioned range of the viewing angle θ, it becomes easy to control the viewing angle of light transmitted through the island portion 5 of the light control filter 10.

In the case of the upper limit value or less within the above-mentioned range of the viewing angle θ, the amount of light transmitted through the island portion 5 of the light control filter 10 can be increased. In addition, the light control filter 10 can be relatively easily manufactured.

The aspect ratio is a ratio between an average value obtained by measuring the sizes R of both the end portions and an average value obtained by measuring the heights H in ten or more island portions 5 randomly selected from the plurality of island portions 5 of the light control filter 10. Each of the sizes R and each of the heights H may be measured through use of known microstructure observation means, such as a measurement microscope.

A pitch P of the arrangement of the island portions 5 on the first principal surface 1 and the second principal surface 2, that is, the pitch P between adjacent end portions of the island portions 5 exposed to each of the principal surfaces is a distance between centers of smallest circles each including an end portion. The pitch P is, for example, preferably from 10 μm to 500 μm, more preferably from 15 μm to 300 μm, still more preferably from 20 μm to 200 μm from the viewpoint of ease of control of the viewing angle of light transmitted through the light control filter 10.

When the pitch P is equal to or more than the above-mentioned lower limit value, it becomes easy to produce a molding mold to be used for manufacturing. When the pitch P is equal to or less than the above-mentioned upper limit value, the visibility of an image viewed through the light control filter 10 is increased, and a sufficient resolution is easily obtained.

The pitch P is preferably constant on each of the principal surfaces. The pitch P between the respective principal surfaces may be identical to or different from each other.

The pitch P is determined by subjecting an image obtained by photographing an arbitrary principal surface to image processing by a known method.

When the pitch P on an arbitrary principal surface varies depending on the region of the principal surface, it is preferred that the pitch P of three or more consecutive island portions 5 fall within the above-mentioned ranges. It is more preferred that the pitch P of five or more consecutive island portions 5 fall within the above-mentioned ranges. It is still more preferred that the pitch P of ten or more consecutive island portions 5 fall within the above-mentioned ranges.

The arrangement of the island portions 5 on the first principal surface 1 and the second principal surface 2 is a two-dimensional array arrangement of X columns×Y rows. The arrangement of the island portions 5 is not limited to this example, and any arrangement patterns are adopted. In X columns×Y rows, for example, X and Y may be independently set to any integers of from 10 to 1,000. When the plurality of island portions 5 are arranged in a two-dimensional array, each line segment connecting the centers of the adjacent island portions 5 in an arbitrary column is located on one straight line, and each line segment connecting the centers of the adjacent island portions 5 in an arbitrary row is located on one straight line. The above-mentioned straight line representing each column and the above-mentioned straight line representing each row intersect with each other at about 90°.

The arrangement pattern may be a two-dimensional array shape, a zigzag shape, any other patterns, or an arbitrary random arrangement.

Figure 3:
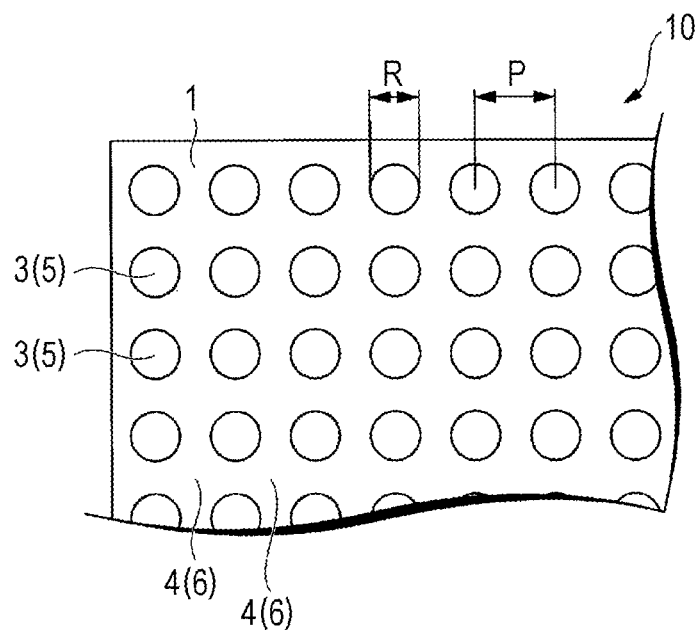
FIG. 3 is a top view of a part of the light control filter 10 of FIG. 1.
Figure 7:
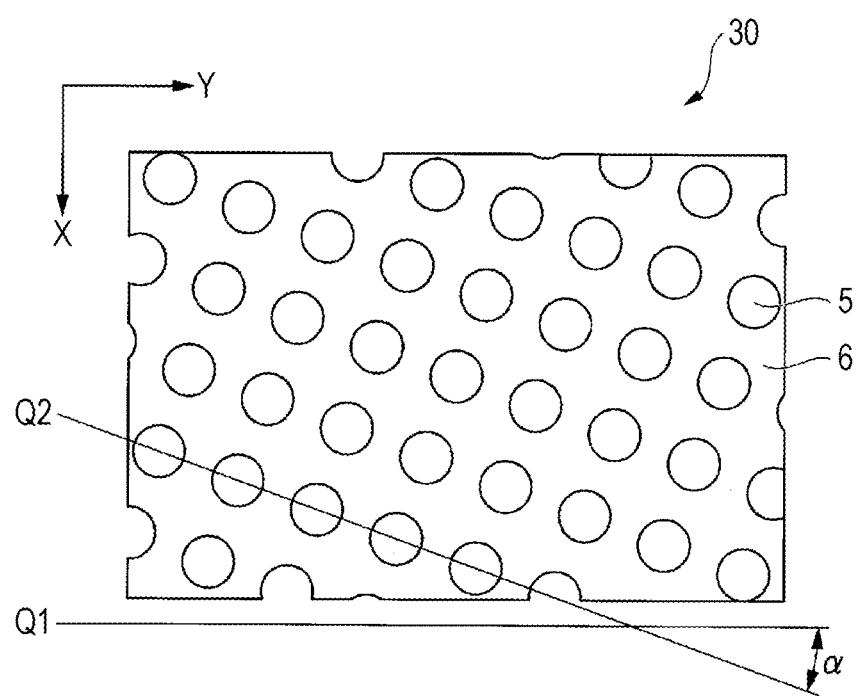
FIG. 7 is a top view of a light control filter 30 according to this disclosure.

In the two-dimensional array of X columns×Y rows of the island portions 5 of the light control filter 10 illustrated in FIG. 1 and FIG. 3, the array direction of the island portions 5 of each column (direction of the straight line representing each column) is parallel to a side in the X-direction forming an outer edge of the light control filter 10, and the array direction of the island portions 5 of each row (direction of the straight line representing each row) is parallel to a side in the Y direction forming an outer edge of the light control filter 10. As a modification example, the Y rows of the two-dimensional array of X columns×Y rows including the plurality of island portions 5 may be arranged in a direction that is not parallel to the side in the Y-direction of the outer edge but intersects therewith. In this case, the X rows of the two-dimensional array are arranged in a direction that is not parallel to the side in the X-direction of the outer edge but intersects therewith. For example, referring to FIG. 7, when the Y-direction of the outer edge of the light control filter 30 is represented by a straight line Q1, and the array direction of the Y rows of the island portions 5 is represented by a straight line Q2, the straight line Q1 and the straight line Q2 intersect with each other at an angle α. The angle α of an intersection between the side in the Y-direction and the Y rows may be arbitrarily adjusted, and is set to preferably from 10° to 30°, for example, on an acute angle side. In the case where the intersection angle is provided as described above, when the light control filter is aligned to be bonded to a frame of a display screen, the occurrence of interference fringes (moire) caused by interference between the pixel array pattern on the display screen and the array pattern of the plurality of island portions 5 included in the light control filter can be reduced.

The light-transmitting portions 3 that are the island portion 5 of the light control filter 10 are through holes formed in the light-shielding portion 4 that is the sea portion 6. Each of the through holes may be filled with air or may be filled with a light-transmitting material. When the through hole is filled with air, the refractive index of transmitted light is small, and hence the viewing angle θ can be reduced. When the through hole is filled with a light-transmitting material, the shape of the through hole is easily kept by the light-transmitting material, and the shape of each of the light-transmitting portions 3 is easily kept even when the light control filter 10 is deformed.

Examples of the light-transmitting material include a transparent resin and glass. From the viewpoint of increasing the flexibility of the light control filter 10, a transparent elastomer is preferred. Specific examples of the transparent elastomer include silicone and polyurethane. The number of the kinds of the transparent elastomer filled into the through hole may be one or two or more. From the viewpoints of excellent transparency, heat resistance, and the like, the transparent elastomer is preferably a silicone rubber.

(Light-Shielding Portion)

The light-shielding portion 4 of the light control filter 10 is the sea portion 6 in the sea-island structure, and is an opaque portion excluding the island portions 5.

The length in the Z-direction of the light-shielding portion 4 is the same as the thickness of the light control filter 10, and is preferably 50 µm or more and 1,000 µm or less, more preferably 80 µm or more and 500 µm or less, still more preferably 100 µm or more and 300 µm or less. When the length is equal to or more than the above-mentioned lower limit value, it becomes easy to control the viewing angle (transmission angle) θ of light. When the length is equal to or less than the above-mentioned upper limit value, the flexibility is further increased.

The content of the elastomer with respect to the total mass of the light-shielding portion 4 is preferably from 50 mass % to 99 mass %, more preferably from 60 mass % to 97 mass %, still more preferably from 70 mass % to 95 mass %.

When the content is equal to or more than the above-mentioned lower limit value, the flexibility of the light control filter 10 is sufficiently increased. When the content is equal to or less than the above-mentioned upper limit value, there can be room for sufficient inclusion of a light-shielding material in the light-shielding portion 4. The remaining part excluding the content of the elastomer in the total mass may be allocated to the light-shielding material.

In addition, in the case where the content is close to the above-mentioned lower limit value, when the light control filter 10 is molded in the molding mold at the time of manufacturing, it becomes easy to remove air bubbles from the molding mold and the light control filter 10 before being cured. When the content is close to the above-mentioned upper limit value, it becomes easy to remove the light control filter 10 from the molding mold at the time of manufacturing.

The light control filter 10 is formed of an elastomer, and hence the light control filter 10 can be easily removed from the molding mold, and processing required for adjusting the thickness is also facilitated. In addition, it is preferred that the light control filter 10 be formed of an elastomer because the light control filter 10 is reduced in weight as compared to the case in which the light control filter 10 is formed of silicon or a metal.

A known elastomer is applied to the elastomer forming the light-shielding portion 4, and the elastomer may be transparent or opaque. The number of the kinds of the elastomer forming the light-shielding portion 4 may be one or two or more.

When the light-transmitting portions 3 each include an elastomer, the adhesiveness between the light-shielding portion 4 and the light-transmitting portions 3 is increased, and the light-shielding portion 4 and the light-transmitting portions 3 are integrated to sufficiently increase the flexibility of the light control filter 10. Therefore, it is preferred that the elastomer included in the light-transmitting portions 3 and the elastomer included in the light-shielding portion 4 be the same.

The elastomer included in the light-shielding portion 4 is preferably a silicone rubber.

It is preferred that the light-shielding portion 4 include a light-shielding material in addition to the elastomer. As the light-shielding material, at least one of a light-absorbing material or a light-reflecting material is used.

The light-absorbing material contains a light-absorbing agent. Examples of the light-absorbing agent include carbon, a dye, and a pigment. Of the light-absorbing agents, carbon is preferred because the light-absorbing property thereof is excellent. Examples of the carbon include carbon black, graphite, and carbon fibers, and carbon black is preferred because carbon black is widely used as a light-absorbing agent.

An example of the light-reflecting material is a metal. Examples of the metal include aluminum, silver, gold, chromium, and nickel.

Second Embodiment

Figure 4:
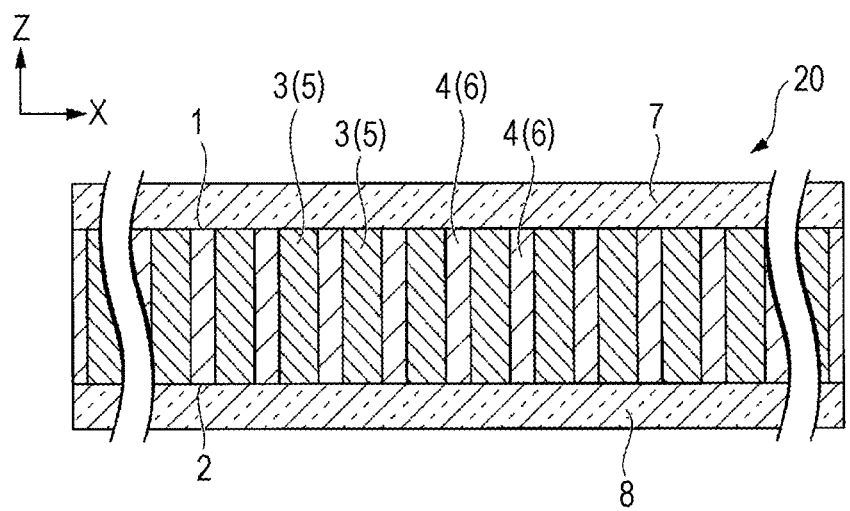
FIG. 4 is a sectional view of a light control filter 20 according to a second embodiment of this disclosure taken along the X-axis.

A light control filter 20 illustrated in FIG. 4 as a second embodiment of this disclosure includes the light control filter 10 according to the first embodiment as a main body, and a first transparent sealing layer 7 and a second transparent sealing layer 8 are laminated on the principal surfaces 1 and 2 of the main body, respectively.

Each of the transparent sealing layers of the light control filter 20 covers each of the principal surfaces of the main body to protect the main body. In the case where each of the transparent sealing layers is present, when the light-transmitting portions 3 are cavity through holes, foreign matter can be prevented from entering the through holes from outside.

In addition, when an exposed surface of each of the transparent sealing layers is smooth, irregular reflection of light on the surface is prevented, and an opposite side of the light control filter 20 can be seen through the light-transmitting portions 3.

An arithmetic average roughness (Ra) of the exposed surface of each of the transparent sealing layers is preferably 0 μm or more and 1 μm or less, more preferably 0 μm or more and 0.2 μm or less. When the arithmetic average roughness (Ra) falls within the above-mentioned ranges, irregular reflection of light on the surface of the transparent sealing layer is suppressed, and light is enabled to be easily transmitted. Herein, the arithmetic average roughness (Ra) is a value determined in accordance with JIS B0601:2013 (ISO 4287:1997).

A constituent material for each of the transparent sealing layers only needs to be transparent, and examples thereof include glass and a transparent synthetic resin. Specific examples thereof include a silicone, a polyurethane, an acrylic resin, an epoxy resin, a polyester, a polycarbonate, a cycloolefin, and a liquid crystal polymer.

From the viewpoint of enhancing the adhesion with the main body, the material forming the transparent sealing layer is preferably an elastomer similar to the elastomer included in the sea portion 6 forming the main body. In addition, when the transparent sealing layer is glass, rigidity can be imparted to the light control filter 20, and the heat resistance can be further improved.

When the transparent sealing layer is glass, from the viewpoint of enhancing the adhesiveness between the glass and each of the principal surfaces of the main body, it is preferred that at least one of a contact surface of the glass or each of the principal surfaces be subjected to surface treatment.

Examples of the surface treatment include excimer UV irradiation treatment, plasma treatment, and primer application treatment using a silane coupling agent or the like.

The first transparent sealing layer 7 and the second transparent sealing layer 8 may be each formed of the same transparent material, or may be formed of different transparent materials.

Each of the first transparent sealing layer 7 and the second transparent sealing layer 8 may be formed as a plurality of layers. In the plurality of layers, the respective layers may be formed of the same transparent material or different materials. For example, a laminate of a glass layer and a transparent resin layer may form the above-mentioned transparent sealing layer. In the laminate, the glass layer may be brought into contact with the principal surface of the sheet, or the transparent resin layer may be brought into contact with the principal surface of the sheet.

The thickness of each of the transparent sealing layers is preferably 1 μm or more and 200 μm or less, more preferably 3 μm or more and 175 μm or less, still more preferably 5 μm or more and 150 μm or less. When the thickness of the transparent sealing layer is equal to and more than the above-mentioned lower limit value, the main body of the light control filter can be sufficiently protected, and the irregularities of each of the principal surfaces of the main body can be sufficiently smoothened, with the result that the thickness of each of the transparent sealing layers can be easily controlled at the time of manufacturing. When the thickness of each of the transparent sealing layers is equal to or less than the above-mentioned upper limit value, a sufficient light-transmitting property can be ensured, and satisfactory optical characteristics are obtained.

The thickness of the transparent sealing layer is determined as an average value of values measured in ten or more randomly selected cross-sections. Known microstructure observation means, such as a measurement microscope, is applied to the measurement.

The MD-1 rubber hardness of the sea portion 6 of the light control filter 20 is a value measured by removing the first transparent sealing layer 7 and the second transparent sealing layer 8 to obtain only a sheet forming the sea-island structure.

The light control filters according to the first and second embodiments described above each include the light-transmitting portions 3 that are the island portions 5 and the light-shielding portion 4 that is the sea portion 6. Of light beams having entered the first principal surface 1, a light beam having entered the columnar island portions 5 is transmitted therethrough and emitted from the second principal surface 2, and a light beam having entered the sea portion 6 is absorbed or reflected by the sea portion 6.

When the array, the pitch P, the size R, and the aspect ratio of the light-transmitting portions 3 of the columnar island portions 5 are appropriately adjusted, the viewing angle (transmission angle) θ of the light beam, and the amount of transmitted light can be controlled.

Action and Effect

In the light control filter 10, at least the sea portion 6 has an MD-1 rubber hardness of 25 or more and 80 or less, and hence the light control filter 10 has high flexibility, and is easily elastically deformed. In addition, when the MD-1 rubber hardness of the entire light control filter 10 is 25 or more and 80 or less, the light control filter 10 has higher flexibility, and is more easily elastically deformed. Therefore, it is not required to laminate a support layer configured to maintain the mechanical strength of the light control filter 10, and the light control filter 10 can be handled in the form of a single body as a single layer light control filter. In general, when the support layer is laminated, the thickness of the support layer is added. Therefore, light is attenuated in the support layer, and the light-transmitting property is decreased. In contrast, when there is no support layer that causes attenuation of light, the light-transmitting property is increased.

In the light control filter 10, it is not required to laminate the support layer, and hence the light control filter 10 can be reduced in thickness. In general, the lamination of the support layer is not suitable for the purpose of reducing thickness because the thickness of the support layer is added. The light control filter 10 that can be reduced in thickness can reduce the occupied space thereof in a device to which the light control filter is to be mounted, and hence the light control filter 10 contributes to the reduction in thickness of the device.

Also in the light control filter 20 including the transparent sealing layers, the flexibility of the light control filter 10 that is the main body of the light control filter 20 and the ease of reduction in thickness thereof are useful.

Third and Fourth Embodiments; Inversion of Light-Transmitting Portion and Light-Shielding Portion Light control filters (not shown) according to third and fourth embodiments of this disclosure each include light-shielding portions that are island portions and a light-transmitting portion that is a sea portion. The light control filters according to the third and fourth embodiments of this disclosure are the same as those according to the first and second embodiments except that the light-shielding portion and the light-transmitting portion are inverted.

It is preferred that at least 70 mass %, preferably 80 mass % to 100 mass % of the total mass of the sea portion be formed of a transparent elastomer. The sea portion may include materials other than the elastomer. The island portion includes the above-mentioned light-shielding material, and may include a known binder in addition thereto. From the viewpoint of enhancing the adhesion between the sea portion and the island portions, it is preferred that an elastomer of the same kind as that of the elastomer forming the sea portion be included also in the island portions.

The light control filters according to the third and fourth embodiments described above each include the light-shielding portions that are the island portions and the light-transmitting portion that is the sea portion. Of light beams having entered the first principal surface, a light beam having entered the columnar island portions is absorbed or reflected by the columnar island portions, and a light beam having entered the sea portion is transmitted therethrough and emitted from the second principal surface.

When the array, the pitch, the size, and the aspect ratio of the light-shielding portions of the columnar island portions are appropriately adjusted, the viewing angle (transmission angle) of the light beam, and the amount of transmitted light can be controlled.

The light control filter according to this disclosure is mounted on an image display apparatus, such as a liquid crystal display apparatus, for example, for the purposes of viewing angle control, brightness improvement, antiglare treatment, and the like. In addition, specifically, the light control filter may be mounted on, for example, a light-emitting body, such as a light-emitting diode or an organic electroluminescence element, or a light-receiving body, such as an optical sensor.

<Method of Manufacturing Light Control Filter>

Figure 5A:
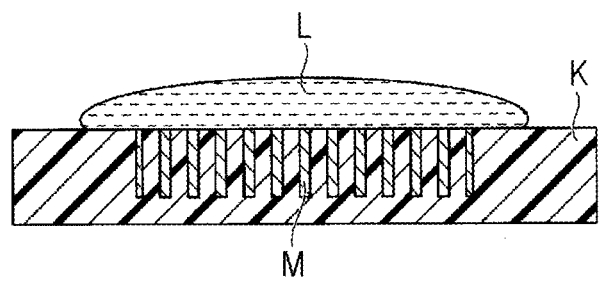
FIGS. 5A to 5E are sectional views for illustrating a state in which the light control filters 10 and 20 according to this disclosure are manufactured.
Figure 5B:
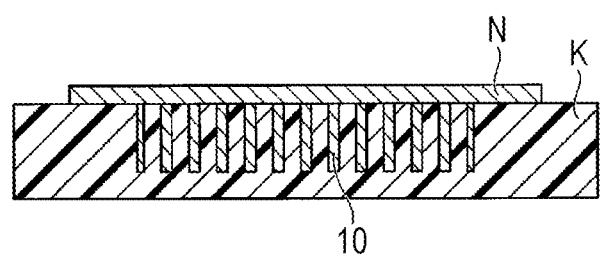

As a method of manufacturing the light control filter of this disclosure, for example, there is given a method involving molding a sheet through use of a molding mold having irregularities formed thereon and transferring the irregularities of the molding mold onto the sheet. As a specific example, first, as illustrated in a sectional view of FIG. 5A, a liquid elastomer precursor L containing a light-shielding material is applied to the surface of a molding mold K in which a recess M corresponding to the sea portion 6 in the sea-island structure of the light control filter 10 according to the first embodiment is formed. Next, as illustrated in FIG. 5B, the elastomer precursor L filled into the recess M of the molding mold K is cured, to thereby form the light control filter 10 in the molding mold K. In a region corresponding to each of the island portions 5 of the light control filter 10 formed in this case, a protruding portion (non-recess portion) of the surface of the molding mold K is present.

When the light control filter 10 is formed in the recess of the molding mold K, the elastomer precursor L having overflowed from the recess M without entering the recess M becomes a residual film N that covers one principal surface of the light control filter 10. The excess residual film N is removed by cutting or polishing, and the target light control filter 10 is taken out from the molding mold K.

Figure 5C:
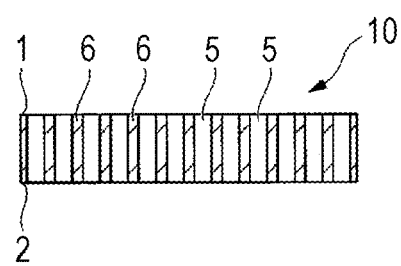
Figure 5D:
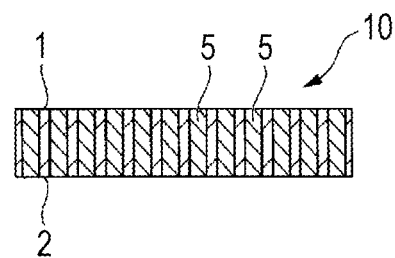
Figure 5E:
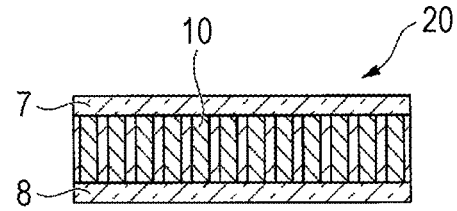

An inner space of each of the island portions 5 that penetrate through the obtained light control filter 10 in a thickness direction thereof is a cavity (FIG. 5C), and may be filled with a light-transmitting material as required (FIG. 5D). In addition, when the first transparent sealing layer 7 and the second transparent sealing layer 8 are laminated on the first principal surface 1 and the second principal surface 2 of the light control filter 10, respectively, by a conventional method, the light control filter 20 according to the second embodiment is obtained (FIG. 5E).

The molding mold K is a flat sheet in which a recess for forming the sea portion 6 and a plurality of columnar protruding portions (non-recess portions) for forming the island portions 5 in the recess are formed on the surface. The depth of the recess and the height of the protruding portion are the same. The pitch between the protruding portions corresponds to the pitch P between the island portions 5, the height of the protruding portion corresponds to the height of the island portion 5, and the size of the protruding portion corresponds to the size R of the island portion 5.

In the molding mold K, the axial line direction of a central axis of each of the protruding portions and the side surface of the protruding portion are arranged so as to be perpendicular to the bottom surface of the molding mold K.

Through use of such molding mold K, the side surface of the island portion 5 in the obtained light control filter 10 can be formed so as to be perpendicular to each principal surface of the light control filter 10.

As a method of producing the molding mold K, there are given, for example, a method involving forming the recess M by subjecting one surface of a base material having a flat sheet shape to dry etching and a method involving forming the recess M by cutting one surface of a base material having a flat sheet shape. As the base material having a flat sheet shape, there are given, for example, a silicon wafer and a quartz substrate.

Examples of the dry etching include plasma etching, laser etching, and ion etching. As a method for the plasma etching, there is given a method involving arranging a mask on a surface of a base material and irradiating a substrate surface with plasma through the mask to etch only the surface that is not covered with the mask, to thereby form the recess M.

As specific methods of molding the sea portions 6 through use of a molding mold, there are given, for example, the following methods (a-1) to (a-5).

(a-1): A method involving applying the liquid elastomer precursor L to a flat surface of a support film to form a film of the elastomer precursor L and then pressing the recess M of the molding mold K against the film, followed by curing of the elastomer precursor L.

(a-2): A method involving causing the liquid elastomer precursor L to flow down to the recess M of the molding mold K, filling the elastomer precursor L into the recess M through use of a spatula or the like, and after that, curing the elastomer precursor L.

(a-3): A method involving applying the liquid elastomer precursor L to the recess M of the molding mold K, pressing the applied elastomer precursor L with a pressing die to fill the elastomer precursor L into the recess M, and after that, curing the elastomer precursor L.

(a-4): A method involving pressing a sheet of an elastomer produced in advance against the recess M of the molding mold K with heating, to thereby transfer irregularities onto the sheet softened with heat.

(a-5): A method involving mounting the molding mold K on an injection molding machine and subjecting an elastomer to injection molding.

In the method (a-1), as the liquid elastomer precursor L, there are given, for example, curable compounds, such as a curable silicone, an isocyanate, and a polyol. A polymerization catalyst may be added to the elastomer precursor L. When the elastomer precursor L has a thermosetting property, a thermal polymerization catalyst is added. When the elastomer precursor L has a photo polymerizable property, a photopolymerization catalyst is used. In addition, the above-mentioned light-shielding material may be added to the elastomer precursor L. When the light-shielding material is added, the light-shielding portion 4 is formed in the sea portion 6. When a transparent elastomer is formed without adding the light-shielding material, the light-transmitting portion 3 is formed in the sea portion 6. Other components, such as a solvent, may be further mixed with the elastomer precursor L as required (the same applies also to the following methods).

As the support film, a film which can be easily peeled from the obtained light control filter 10 is preferred, and there are given, for example, a polyethylene terephthalate film, a polypropylene film, and the like. As a method of applying the elastomer precursor L to the support film, there is given a method using a known coater. The amount of the elastomer precursor L applied to the support film is adjusted to an amount sufficient for manufacturing the target light control filter 10.

The elastomer precursor L is filled into the recess M by pressing the recess M of the molding mold K against the film of the elastomer precursor L formed on the support film, to thereby form irregularities in which irregular shapes are inverted on the film. As a method of thermally curing the elastomer precursor L, there are given, for example, a method involving heating the molding mold K pressed against the film, and a method involving heating the molding mold K through use of an external heater provided separately from the molding mold K. When the elastomer precursor L is photocured, for example, the elastomer precursor L is photocured by irradiation with UV light or an electron beam.

When the elastomer precursor L is cured, the light control filter 10 can be formed.

In the method (a-2), the amount of the elastomer precursor L that is caused to flow down to the recess M of the molding mold K is adjusted to an amount with which the target light control filter 10 is obtained.

After the liquid elastomer precursor L is caused to flow down to the recess M of the molding mold K, the surface of the elastomer precursor L is levelled with a spatula or the like, to thereby fill the elastomer precursor L into the recess M. After that, the elastomer precursor L is cured to form the light control filter 10. As a curing method, the same method as that in the above-mentioned (a-1) may be adopted.

As a method of applying the elastomer precursor L in the method (a-3), there is given, for example, a method involving pressing and spreading the elastomer precursor L against the liquid elastomer precursor L adhering to an arbitrary position of the recess M of the molding mold K by pressing a pressing die, to thereby fill the elastomer precursor L into the recess M. In addition, as the application method, a known coater may be adopted. As the curing method, the same method as that in the above-mentioned (a-1) may be adopted.

The method (a-4) is a press molding method using a known press molding machine. The light control filter 10 can be formed by mounting the molding mold K on the press molding machine and press-molding an elastomer. The elastomer may contain the light-shielding material and other components.

The method (a-5) is an injection molding method using a known injection molding machine. The light control filter 10 can be formed by mounting the molding mold K on the injection molding machine and molding an elastomer. The elastomer may contain the light-shielding material and other components.

In the method including the steps (a-1) to (a-5), when the light control filter 10 is formed in the recess M of the molding mold K, the elastomer precursor L having overflowed from the recess M without entering the recess M becomes the residual film N.

As an advantage of forming the residual film N, there is given the following: when the elastomer precursor L is cured, the shape of an edge of an opening of the recess M (shape of a distal end of the protruding portion) is easily reflected on the shape of an end portion of the island portion 5 of the light control filter 10 to be formed, that is, the island portion 5 reflecting the shape of the recess M can be formed with satisfactory accuracy.

As a method of removing the excess residual film N after curing, there are given, for example, a known contact method involving cutting or polishing a surface of a general substrate, and a known non-contact method, such as laser processing and plasma treatment.

When the light control filter 10 is shaped into a desired form, it is preferred that the light control filter 10 be cooled to, for example, a temperature of from −10° C. to −50° C., preferably from −20° C. to −40° C. to increase the hardness of the light control filter 10, and then the light control filter be cut, because shaping processing, such as cutting, is facilitated. When the Shore A hardness of the sea portion 6 of the light control filter 10 is A50 or more, the light control filter 10 can be easily subjected to cutting processing at an ordinary temperature (for example, from 20° C. to 25° C.).

The light control filter 10 has flexibility and is elastically deformed. Therefore, it is relatively easy to take out the light control filter 10 from the molding mold K, and the irregularities of the molding mold K can be prevented from being broken when the light control filter 10 is taken out.

As a method of filling a light-transmitting material or a light-shielding material into the through holes that are the island portions 5 of the light control filter 10 taken out from the molding mold K, a conventional method is applied, and there are given, for example, the following methods (b-1) to (b-4).

(b-1): A method involving causing a paint containing materials to flow down to the first principal surface 1 through which the through holes of the light control filter 10 are opened and raking and putting the paint into the through holes, to thereby fill the paint into the through holes through use of a spatula or the like.

(b-2): A method involving causing a paint containing materials to adhere to the first principal surface 1 through which the through holes of the light control filter 10 are opened and pressing a pressing die against the paint to push the paint into the through holes, to thereby fill the paint into the through holes.

(b-3): A method involving immersing the light control filter 10 into a paint containing materials, to thereby cause the paint to flow into the through holes.

The paint filled into the through holes is cured by a conventional method.

It is preferred that the paint contain a curable resin precursor or a binder. When a known resin precursor that forms a transparent resin is applied, the light-transmitting portions 3 can be formed in the island portions 5. When a known resin precursor for forming an opaque resin or a composition obtained by adding the light-shielding material to a known resin precursor for forming a transparent resin is used, the light-shielding portions 4 can be formed in the island portions 5.

Examples of the resin precursor include a thermosetting silicone, an isocyanate and a polyol forming a polyurethane, an acrylic compound, an epoxy compound, and an unsaturated polyester.

In addition, a light-transmitting material may be set in each of the island portions 5 by inserting an optical fiber made of a resin or glass that is fitted with the island portion 5 into the island portion 5.

The land film is not present in each of the island portions 5 of the light control filter 10, and hence the paint can be easily caused to flow into the island portion 5, and the light-transmitting member can be easily inserted into the island portion 5.

As a method of forming at least one of the first transparent sealing layer 7 or the second transparent sealing layer 8 on each of the first principal surface 1 and the second principal surface 2 of the light control filter 10, a conventional method of forming a transparent layer on the surface of a general substrate is applied. Specifically, there are given, for example, the following methods (c-1) and (c-2).

(C-1): A method involving applying a paint containing a thermosetting compound or a photocurable compound to the principal surface and curing the paint by heating or light irradiation.

(C-2): A method involving laminating a transparent resin film or transparent glass produced in advance on the principal surface.

Examples of the thermosetting compound and the photocurable compound include an acrylic compound, an epoxy compound, a thermosetting silicone, and an isocyanate and a polyol forming a polyurethane. The paint containing those curable compounds may contain a polymerization initiator. Examples of the polymerization initiator include organic peroxides and azo compounds. The paint may contain a known organic solvent.

As the method involving laminating a transparent resin film or transparent glass, there are given, for example, a method involving bonding through use of an adhesive and a method involving thermocompression bonding.

[Shaping of Principal Surface of Light Control Filter 10]

When a residual film R remains on the second principal surface 2 of the light control filter 10 before or after a light-transmitting member is set in each of the island portions 5 of the light control filter 10 according to each embodiment, as a suitable method of removing the residual film R and molding the first principal surface 1 on a surface parallel to the second principal surface 2, there is given a method exemplified below. In the following figures, there is illustrated a case of removing the residual film R of the light control filter 10 after the light-transmitting member is set in each of the island portions 5. Referring to this case, the residual film R can be removed by the same method also in the light control filter 10 in which the island portions 5 immediately after demolding are hollow (cavities). The residual film R corresponds to the residual film N of FIGS. 5A to 5E.

Figure 6A:
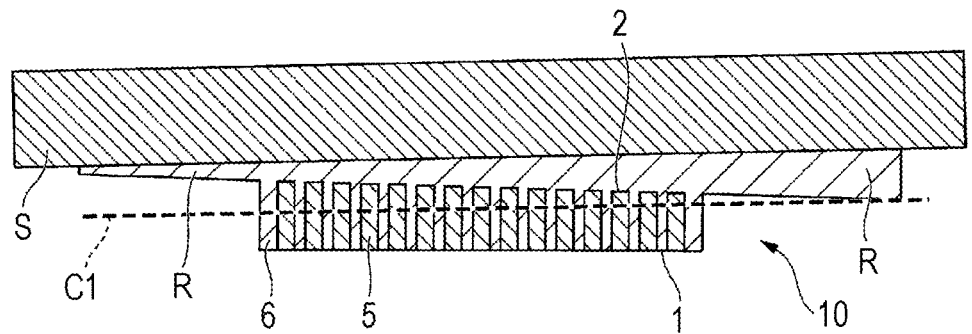
FIGS. 6A to 6D are sectional views for illustrating an example of a method of shaping both the principal surfaces of the light control filter 10 according to this disclosure.

First, as illustrated in a sectional view of FIG. 6A, the residual film R remaining on the second principal surface 2 of the light control filter 10 is fixed in close contact with a flat support surface S of a support stage. The thickness of the residual film R may be non-uniform, and in the figure, the residual film R is drawn so as to emphasize that the residual film R is increased in thickness toward the right side of the drawing sheet.

Next, a cutting blade or a laser is moved in parallel to the support surface S to cut to slice the light control filter 10 at a position as close as possible to a boundary between the residual film R and the second principal surface 2 (for example, a position indicated by the broken line C1 of the figure) so as not to include the residual film R, to thereby form a new flattened second principal surface 2.

Figure 6B:
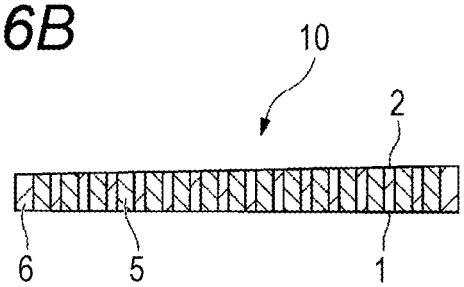

Herein, as illustrated in FIG. 6B, the first principal surface 1 and the second principal surface 2 of the light control filter 10 that has been cut out may be non-parallel to each other.

Figure 6C:
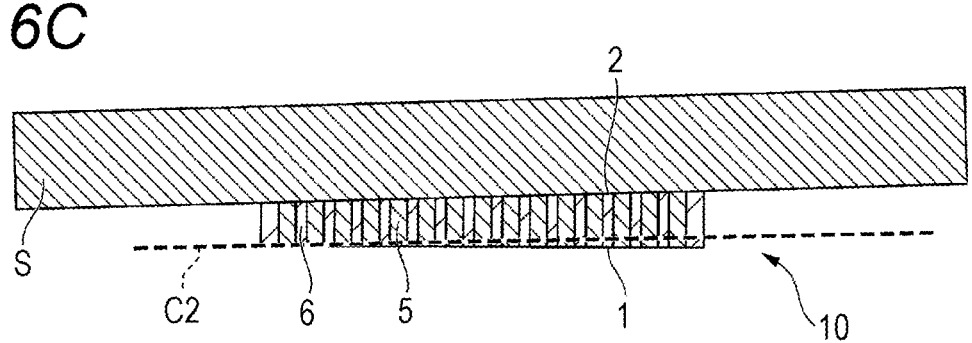

Next, as illustrated in FIG. 6C, the new second principal surface 2 of the light control filter 10 is fixed in close contact with the flat support surface S of the support stage. The cutting blade or laser is moved again in parallel to the support surface S to cut the light control filter 10 at a position as close as possible to the original first principal surface 1 (for example, a position indicated by the broken line C2 of the figure) so as not to leave the original first principal surface 1, to thereby form a new flattened first principal surface 1.

Figure 6D:
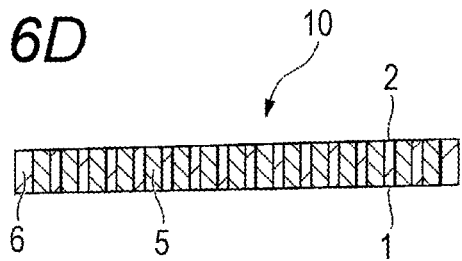

As illustrated in FIG. 6D, the first principal surface 1 and the second principal surface 2 of the light control filter 10 that has been cut out are parallel to each other in this stage. In addition, an angle formed by a straight line connecting the first end portion and the second end portion of each of the island portions 5 with respect to the first principal surface 1 and the second principal surface 2 is changed before and after the residual film R is excised due to the non-uniformity of the thickness of the residual film R. In the illustrated example, the island portions 5 are perpendicular to the original first principal surface 1 but are inclined to the new first principal surface 1.

According to the method of shaping each surface of the light control filter 10 described above, the residual film R can be easily excised, and the first principal surface 1 and the second principal surface 2 that are smooth and parallel to each other are molded. With this, the light control filter 10 having a small thickness, in which the first end portion and the second end portion of each of the island portions 5 are exposed to the first principal surface 1 and the second principal surface 2, respectively, can be easily obtained.

EXAMPLES

Now, this disclosure is further specifically described by way of Examples, but this disclosure is not limited to the following Examples.

Example 1

As a molding mold for manufacturing a light control filter, a molding mold made of silicon (made of Si) was prepared. In the molding mold, a recess having dimensions of 20 mm×20 mm×180 μm (length×width×depth) was formed on the surface, and 400×400 columnar protruding portions (diameter: 30 μm, height: 180 μm) were arrayed in a grid shape at pitches of 50 μm along the X-Y direction in the recess.

In addition, liquid thermosetting silicone (manufactured by Shin-Etsu Chemical Co., Ltd., KE-1935) and carbon black were mixed to obtain a paint for forming alight-shielding portion. The content of the thermosetting silicone with respect to the total mass of the paint was adjusted to be about 95 mass % with respect to the total mass of a cured product obtained after the paint was cured.

The paint for forming a light-shielding portion was applied to the surface of a polyethylene terephthalate film to form a thermosetting silicone film.

Next, the surface of the molding mold having a recess M formed thereon was pressed against the thermosetting silicone film and heated at 130° C. for 5 minutes to cure the thermosetting silicone. Then, after a residual film made of the excess thermosetting silicone that has not entered the recess M was removed by polishing, a light control filter (length×width×thickness=20 mm×20 mm×180 μm) was taken out from the recess of the molding mold. The light control filter had flexibility, was elastically deformed, and had sufficient mechanical strength. Therefore, when the light control filter was taken out, the light control filter was able to be easily taken out without breaking the molding mold.

A sea portion of the light control filter that has been taken out is formed of light-shielding silicone, and island portions thereof are through holes filled with air.

An MD-1 rubber hardness was measured through use of, as a test piece, a laminate (thickness: 1,080 μm) of stacked six light control filters each being formed only of the sea portion, which has been taken out from the molding mold, with "Micro Rubber Hardness Meter" product name: MD-1capa, manufactured by Kobunshi Keiki Co., Ltd. in an environment at 23° C. in accordance with the above-mentioned measurement method (pressing needle shape: type A, pressure leg dimensions: type A, spring load: 22 mN, measurement mode: normal mode). As a result, the MD-1 rubber hardness was 55.

Next, liquid thermosetting silicone (manufactured by Shin-Etsu Chemical Co., Ltd., KE-1935-A/B) was placed on one principal surface of the light control filter. After the liquid thermosetting silicone was pushed into the through holes through use of a pressing die, the liquid thermosetting silicone was cured by heating to 130° C. to form transparent silicone in the through holes.

An MD-1 rubber hardness was measured through use of, as a test piece, a laminate (thickness: 1,080 μm) of the stacked six light control filters obtained herein, in which the sea portion and the island portions were each formed of a silicone rubber, with MD-1capa in an environment at 23° C. in accordance with the above-mentioned measurement method. As a result, the MD-1 rubber hardness was 55.

The sea portion of the obtained light control filter is formed of light-shielding silicone, and the island portions are each formed of transparent silicone. The obtained light control filter had flexibility, was able to be easily elastically deformed, had sufficient mechanical strength, and had high adhesion between the sea portion and the island portions, and the light beam transmittance of the light-transmitting portion formed in each of the island portions was excellent.

In addition, when the light control filter was viewed from the front of the principal surface thereof, an opposite side of the light control filter was able to be seen therethrough. When the light control filter was viewed at an angle diagonal to the principal surface of the light control filter, an opposite side of the light control filter was not able to be seen therethrough. That is, the light control filter was able to sufficiently control the viewing angle.

Next, both the principal surfaces of the light control filter were irradiated with a YAG laser to clean both the principal surfaces.

Subsequently, after both the principal surfaces of the light control filter was subjected to excimer UV treatment by a conventional method, thin transparent glass sheets were laminated. In this step, the light control filter had flexibility, was elastically deformed, and had sufficient mechanical strength, and hence the light control filter was easy to handle as a single body.

The adhesion of the transparent glass sheets respectively laminated on both the principal surfaces was high, and hence the light control filter was also able to be slightly bent.

The invention claimed is:
1. A light control filter, comprising a sheet having a sea-island structure including a light-transmitting portion and a light-shielding portion,
   wherein the light-transmitting portion and the light-shielding portion each extend from a first principal surface to a second principal surface,
   wherein the light-transmitting portion forms a plurality of island portions configured to penetrate completely through the sheet from the first principal surface to the second principal surface, and the light-shielding portion forms a sea portion configured to separate the plurality of island portions from one another,
   wherein the sea portion has an MD-1 rubber hardness of 25 or more and 80 or less, wherein the sea portion includes 50 mass % or more of a silicone rubber with respect to a total mass of the sea portion, wherein an aspect ratio between a size of each of the plurality of island portions in plan view of the sheet and a height of each of the plurality of island portions in a thickness direction of the sheet is from 1:8.5 to 1:25.5, wherein a size of each of the plurality of island portions in plan view of the sheet is 5 μm or more and 50 μm or less, wherein a three-dimensional shape of each of the plurality of island portions in the sheet is a columnar shape, wherein the plurality of island portions are arranged in a two-dimensional array in plan view of the sheet, and wherein the light control filter can be handled in a form of a single layer as a single light control filter, and a support layer configured to maintain the mechanical strength of the light control filter is not required.

2. The light control filter according to claim 1, wherein the plurality of island portions are each hollow.

* * * * *